(12) United States Patent
Mochizuki et al.

(10) Patent No.: US 6,796,030 B2
(45) Date of Patent: Sep. 28, 2004

(54) METHOD OF FABRICATING A VEHICLE BODY FRAME FOR A MOTORCYCLE

(75) Inventors: Shinsuke Mochizuki, Saitama (JP); Masahiko Nakagawa, Saitama (JP); Eitarou Koya, Saitama (JP)

(73) Assignee: Honda Giken Kogyo Kabushiki Kaisha, Tokyo (JP)

(*) Notice: Subject to any disclaimer, the term of this patent is extended or adjusted under 35 U.S.C. 154(b) by 68 days.

(21) Appl. No.: 10/005,353

(22) Filed: Dec. 7, 2001

(65) Prior Publication Data

US 2002/0059728 A1 May 23, 2002

Related U.S. Application Data

(62) Division of application No. 09/371,509, filed on Aug. 10, 1999, now Pat. No. 6,416,072.

(30) Foreign Application Priority Data

Aug. 10, 1998 (JP) .......................................... 10-226366

(51) Int. Cl.[7] ........................... B21D 53/88; B23P 25/00
(52) U.S. Cl. .................... 29/897.2; 29/527.5; 29/527.3; 29/458; 29/460; 280/281.1
(58) Field of Search ................ 29/897.2, 460, 29/458, 527.5, 527.3; 280/281.1, 274; 180/219; 164/459, 464

(56) References Cited

U.S. PATENT DOCUMENTS

| | | | |
|---|---|---|---|
| 3,797,101 A | 3/1974 | Bauer ........................ 29/527.3 |
| 4,145,068 A | 3/1979 | Toyomasu et al. .......... 280/281 |
| 4,340,109 A | 7/1982 | Roddy ........................ 164/97 |
| 4,446,906 A | 5/1984 | Ackerman et al. .......... 164/112 |
| 4,454,740 A | 6/1984 | Neal et al. ...................... 72/53 |
| 4,696,363 A | 9/1987 | Enda .......................... 180/219 |
| 4,735,355 A | 4/1988 | Browning ................... 228/189 |
| 4,887,687 A | * 12/1989 | Asai et al. ................... 180/219 |
| 4,989,665 A | * 2/1991 | Yamagiwa et al. .......... 164/363 |
| 5,113,926 A | 5/1992 | Kanzawa et al. ............ 164/119 |
| 5,178,202 A | 1/1993 | Dannoura et al. ........... 164/112 |
| 5,240,520 A | 8/1993 | Tarui et al. .................. 148/532 |
| 5,259,937 A | * 11/1993 | Hatano et al. ............... 205/149 |
| 5,375,677 A | 12/1994 | Yamagiwa et al. .......... 180/219 |
| 5,381,849 A | 1/1995 | Fussnegger et al. ......... 164/102 |
| 5,409,415 A | 4/1995 | Kawanami et al. ........... 451/39 |
| 5,480,102 A | * 1/1996 | Sato ............................ 242/310 |
| 5,512,006 A | 4/1996 | Wood et al. ................... 451/39 |
| 5,597,529 A | 1/1997 | Tack ........................... 420/532 |
| 5,845,383 A | * 12/1998 | Sato ............................. 29/460 |
| 5,934,546 A | 8/1999 | Otsuka et al. ........... 228/262.51 |
| 6,041,499 A | * 3/2000 | Matsuura et al. ......... 29/888.06 |

FOREIGN PATENT DOCUMENTS

| | | | |
|---|---|---|---|
| DK | 2509044 | 9/1976 | |
| EP | 845321 A1 | * 3/1998 | |
| JP | 59-147763 | * 8/1984 | .................. 164/119 |
| JP | 02059161 A | 2/1990 | |
| JP | 03136993 A | * 6/1991 | .................. 180/219 |
| JP | 07164448 A | 6/1995 | |
| JP | 08141725 A | 6/1996 | |
| JP | 091433793 A | 6/1997 | |
| JP | 41107271 A | 3/1999 | |

* cited by examiner

Primary Examiner—Marc Jimenez
(74) Attorney, Agent, or Firm—Birch, Stewart, Kolasch & Birch, LLP

(57) ABSTRACT

To adopt die casts product as parts of a vehicle body frame. A vehicle body frame is provide with an alumite treating, showing that brightness and appearance of pivot plates which are die cast products differ from those of non-die cast products, head pipes, longitudinal pipes and cross pipe. By carrying out a local coating treatment on the pivot plates, the pivot plates are provided with a color the same as that of the pipe, the longitudinal pipes and the cross pipe. By making die cast products portion of constituent parts, the fabrication cost of the vehicle body frame can be reduced.

10 Claims, 6 Drawing Sheets

US 6,796,030 B2

METHOD OF FABRICATING A VEHICLE BODY FRAME FOR A MOTORCYCLE

This application is a divisional of application Ser. No. 09/371,509, filed on Aug. 10, 1999, now U.S. Pat. No. 6,416,072, the entire contents of which are hereby incorporated by reference and for which priority is claimed under 35 U.S.C. § 120; and this application claims priority of Application No. HEI-10-226366 filed in Japan on Aug. 10, 1998 under 35 U.S.C. § 119 .

BACKGROUND OF THE INVENTION

1. Field of the Invention

The present invention relates to a vehicle body frame for a motorcycle and a fabrication method for manufacturing the same.

2. Description of Background Art

With reference to FIG. 7, a perspective view is illustrated of a representative vehicle body frame for a motorcycle. The frame 100 for a motorcycle is integrated by welding and includes a head pipe 101, upper longitudinal pipes 102, lower longitudinal pipes 103 (one of the pipes 103 is not illustrated), pivot plates 104 and a cross pipe 105.

FIG. 8 is a conventional flow diagram for fabricating a vehicle body frame and the designation STXXX is utilized to designate a particular step number.

ST111: The head pipe is fabricated by a gravity die casting process. The gravity die casting process is also simply referred to as a die casting process and is a fabrication method in which a metal mold is used in place of a sand mold, molten aluminum is injected into the metal mold and a feeding head is applied thereon. Only gravity is utilized on the molten metal and a metal mold is used. Accordingly, the process is also referred to as "gravity die casting." Since the molten metal comprises aluminum, for several tens of thousands of times it is feasible for supplying the molten metal injection into a metal mold made of gray cast iron (FC) or structural carbon steel. The cost of the mold can be reduced as compared with a sand mold.

The gravity die casting is preferably adopted for parts of a motorcycle having more or less complicated shapes because gases are not entrapped and the casting surface is excellent since the injection speed is slow.

ST112: By projecting shot grains onto or buffing a provided head pipe cast article, the surface is finished.

ST113: Similar to ST111, the pivot plates are fabricated by the gravity die casting process.

ST114: By projecting shot grains onto or buffing provided pivot plates cast articles, the surfaces are finished.

ST115: Upper/lower longitudinal pipes as well as the cross pipe are fabricated by drawing or extrusion. Pipes or bars having uniform sections can be fabricated by drawing or extrusion swiftly and in mass production.

ST116: The upper/lower longitudinal pipes and the cross pipe are suitably cut and subjected to bending.

ST117: The above-described head pipes, upper/lower longitudinal pipes, pivot plates and cross pipe are integrated by welding.

ST118: The product is subjected to alumite treatment and an anodic oxidation coating is formed on the surface. Thereby, a beautiful vehicle body frame can be fabricated.

However, according to the gravity die casting, as mentioned above, the injection speed is slow and accordingly, the productivity is low which hinders a reduction in fabrication cost of the vehicle body frame.

OBJECTS AND SUMMARY OF THE INVENTION

Hence, it is an object of the present invention to achieve a reduction in fabrication cost of the vehicle body frame by improving the constitution and the fabrication method.

According to the present invention, a vehicle body frame for a motorcycle is constituted of integrating pipes made of aluminum and a plurality of aluminum cast parts by welding. The portions or the total of the plurality of aluminum cast parts are die cast products.

A die cast product is excellent in the production efficiency, resulting in achieving low cost of a cast product. Hence, by making the die cast products portions of constituent parts, the fabrication cost of a vehicle body frame is reduced.

According to the present invention, a vehicle body frame for a motorcycle is fabricated by the steps of integrating aluminum series die cast products and aluminum series non-die cast products fabricated by a method other than die casting, subjecting an integrated article to an alumite treating and coating only die cast portions.

A state of the skin is deteriorated in a die cast product in comparison with a non-die cast product. Therefore, when alumite treating is completed, a die cast portion of an alumite coating does not have as good an appearance as compared with other portion thereof. Hence, the appearance of the vehicle body frame is maintained by coating only the die cast portion.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

Figure 1:
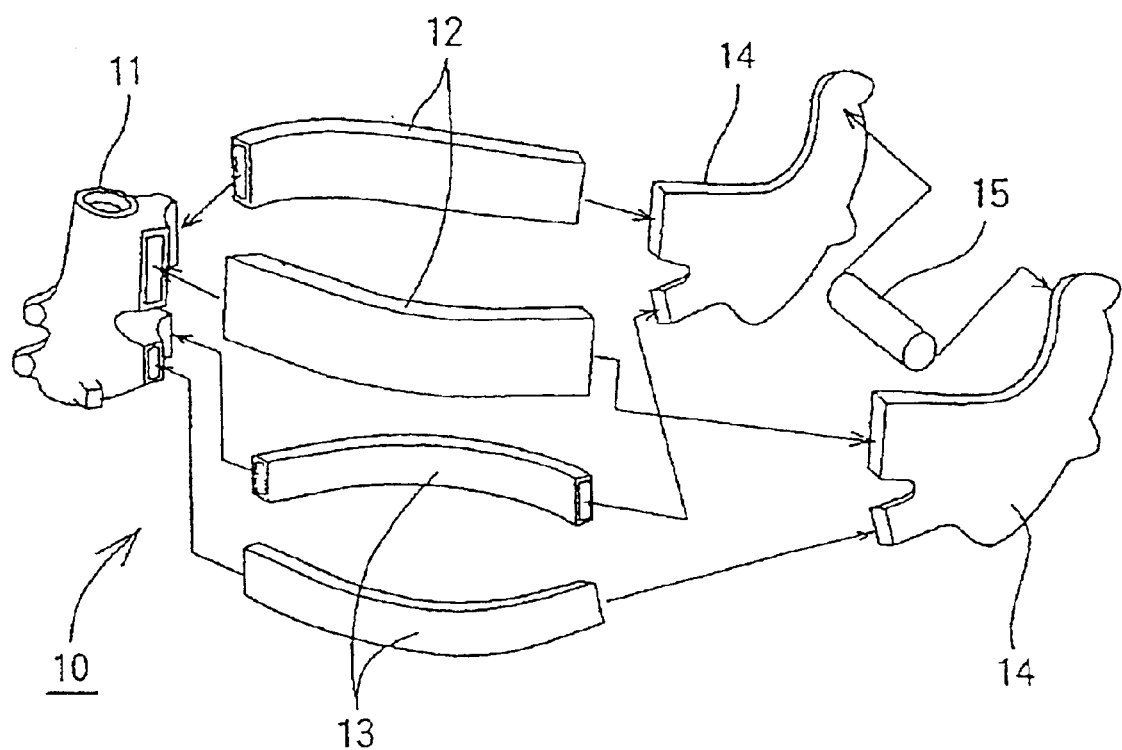
FIG. 1 is an exploded view of a vehicle body frame for a motorcycle according to the present invention.

An explanation will be given as follows of an embodiment of the present invention in reference to attached drawings. FIG. 1 is a disassembled view of a vehicle body frame for a motorcycle according to the present invention. The vehicle body frame 10 for a motorcycle comprises a head pipe 11, upper longitudinal pipes 12, lower longitudinal pipes 13, pivot plates 14 and a cross pipe 15.

Figure 2:
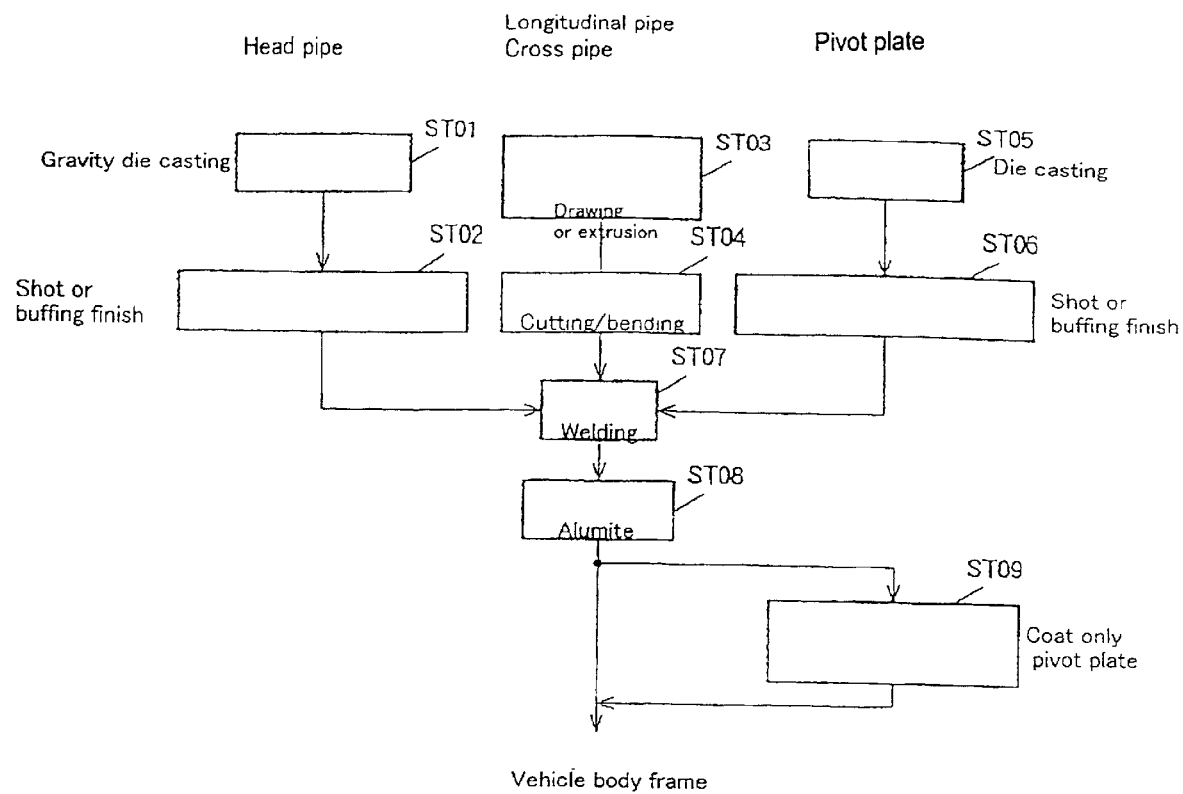
FIG. 2 is a fabrication flow diagram of a vehicle body frame for a motorcycle according to the present invention.

FIG. 2 is a fabrication flow diagram of the vehicle body frame for a motorcycle according to the present invention and STXX designates a step number.

Further, the method of fabricating the head pipe, the upper/lower longitudinal pipes and the cross pipe is the same as described in the conventional technology and a special devise is needed in the method of fabricating the pivot plates.

ST01: The head pipe is fabricated by the gravity die casting process. Although an explanation of the gravity die casting process will be omitted since a detailed explanation thereof has been given in a description of the conventional technology, gases are not entrapped and the casting surface becomes excellent since the injection speed is slow.

ST02: By projecting shot grains onto or buffing the provided head pipe cast article, the surface is finished.

ST03: The upper/lower longitudinal pipes and the cross pipe are fabricated by drawing or extrusion. Pipes or bars having uniform sections can be fabricated by drawing or extrusion swiftly and in mass production.

ST04: The upper/lower longitudinal pipes and the cross pipe are suitably cut and subjected to bending.

ST05: The pivot plates are fabricated by a die cast casting method, described later. The die cast casting method is a fabrication method in which molten aluminum is injected into a cavity under high pressure. Accordingly, the production efficiency is excellent and a large amount of cast products can be fabricated at a low cost.

ST06: By projecting shot grains onto or buffing the provided pivot plate cast articles, the surfaces are finished.

ST07: The above-described head pipe, upper/lower longitudinal pipes, pivot plates and cross pipe are integrated by welding.

ST08: The product is subjected to the alumite treatment and an anodic oxide film is formed on the surface.

ST09: Only the pivot plates are subjected to coating, mentioned later. Thereby, a beautiful vehicle body frame can be fabricated.

Figure 3A:
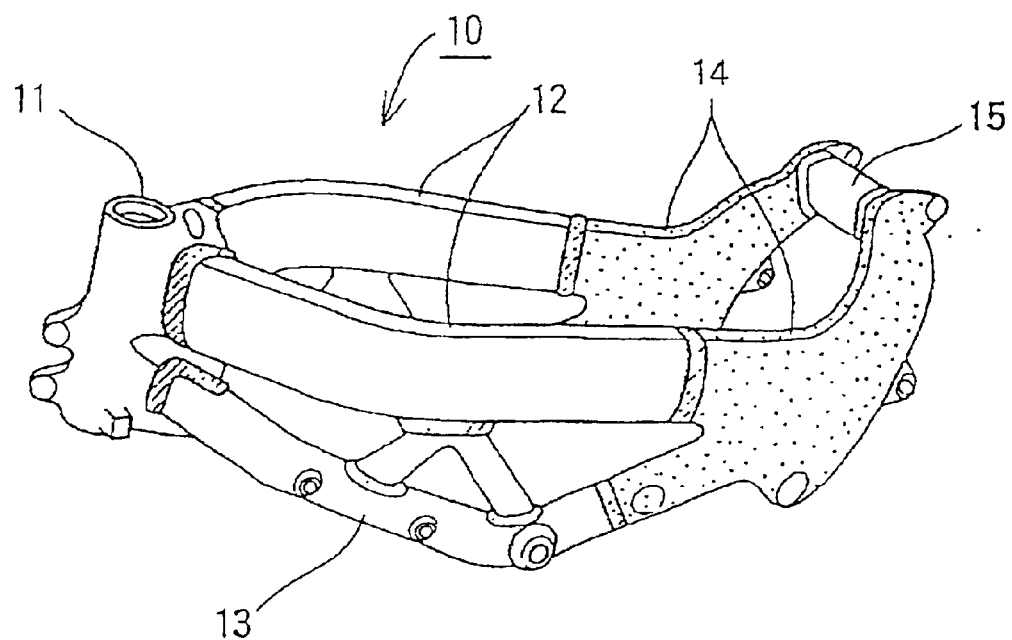
FIG. 3 illustrates views showing the vehicle body frame according to the present invention.
Figure 3B:
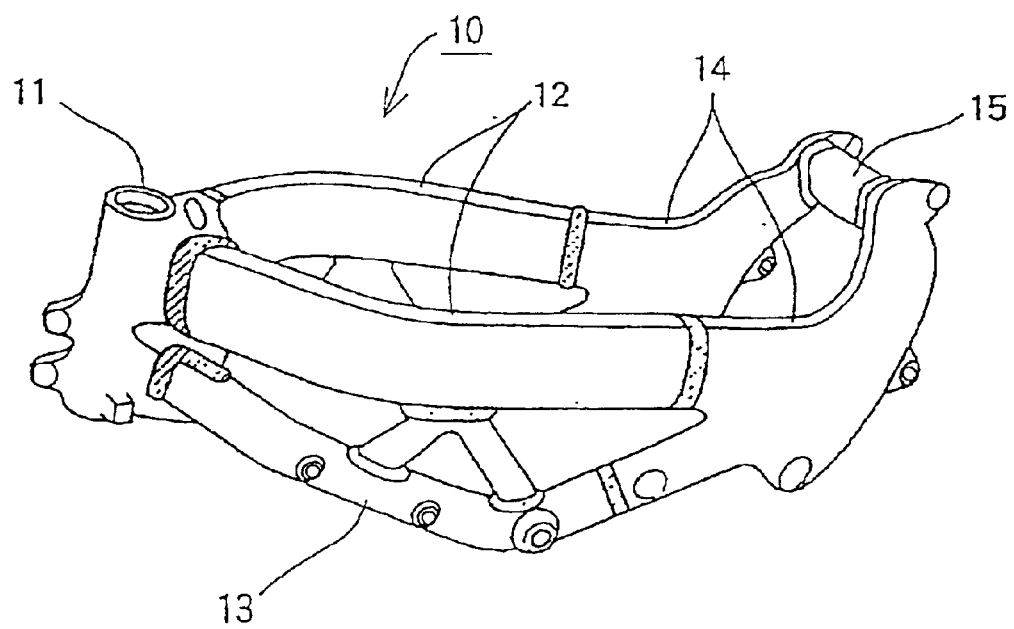

FIGS. 3(a) and 3(b) are views showing the vehicle body frame according to the present invention.

FIG. 3(a) shows the vehicle body frame 10 after the ST08 (alumite treatment), showing that the brightness and appearance differ at the pivot plates 14 in comparison with other portions (head pipe 11, longitudinal pipes 12, 13 and cross pipe 15).

FIG. 3(b) shows the vehicle body frame 10 after the ST09 (local coating treatment), showing that the color of the pivot plates 14 looks like the color of other portions (head pipe 11, longitudinal pipes 12, 13 and cross pipe 15).

A detailed explanation will be given of die casting and coating which are features of the present invention.

In the die casting, the casting speed is extraordinarily higher than those of sand mold casting and metal mold casting. Accordingly, entrapping of gasses is significant, resulting in the roughening of the casting surface, and the entrapped gases remain in the form of air bubbles, resulting in the air bubbles are broken by welding heat.

Hence, there is carried out an experiment to establish a die casting method adaptable to the present invention as a premise of completing the present invention.

Experimental conditions:

(1) Composition of test sample; aluminum alley die cast 6 series (JIS H 5302)

TABLE 1

| Chemical symbol | Chemical components | | | | | | | |
|---|---|---|---|---|---|---|---|---|
| | Cu | Mg | Zn | Fe | Mn | Ni | Sn | Al |
| ADC6 | 0.1 or less | 1.0 or less | 2.5–4.0 | 0.4 or less | 0.8 or less | 0.4–0.6 | 0.1 or less | 0.1 or less | balance |

(2) Injection temperature; 730° C.
(3) Caster; ordinary die casting machine
(4) Gate speed; 5–65 m/s
(5) Gate sectional area; 9.75 cm$^2$ FIG. 4 is a graph illustrating a relationship between gate speed and a material gas amount in which a gas amount in a material (cast product) is illustrated by changing the gate speed in the experiment The abscissa designates the gate speed and the ordinate designates the gas amount per 100 g of aluminum According to the graph, it is known that when the gate speed exceeds 15 m/s, the gas amount rapidly increases.

Figure 5:
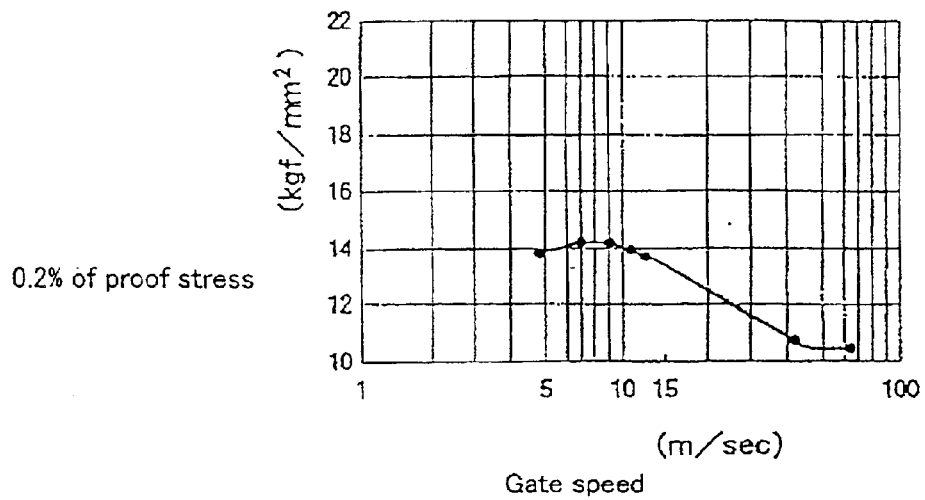
FIG. 5 is a graph showing a relationship between the gate speed and proof strength.
Figure 6:
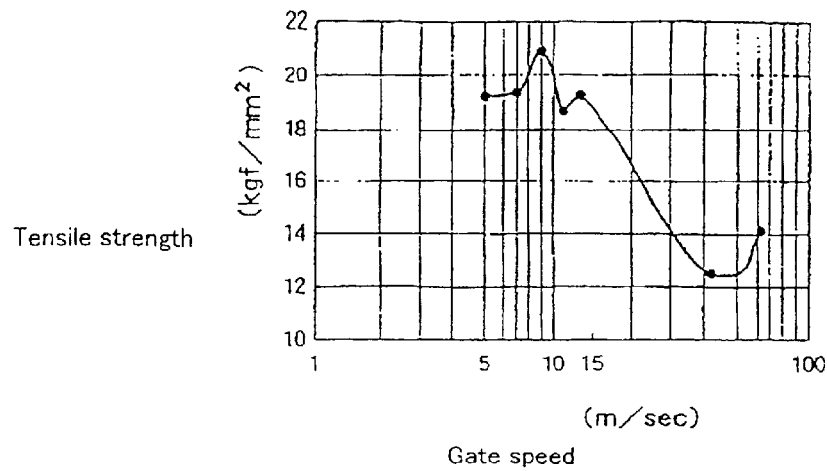
FIG. 6 is a graph showing a relationship between the gate speed and tensile strength.
Figure 7:
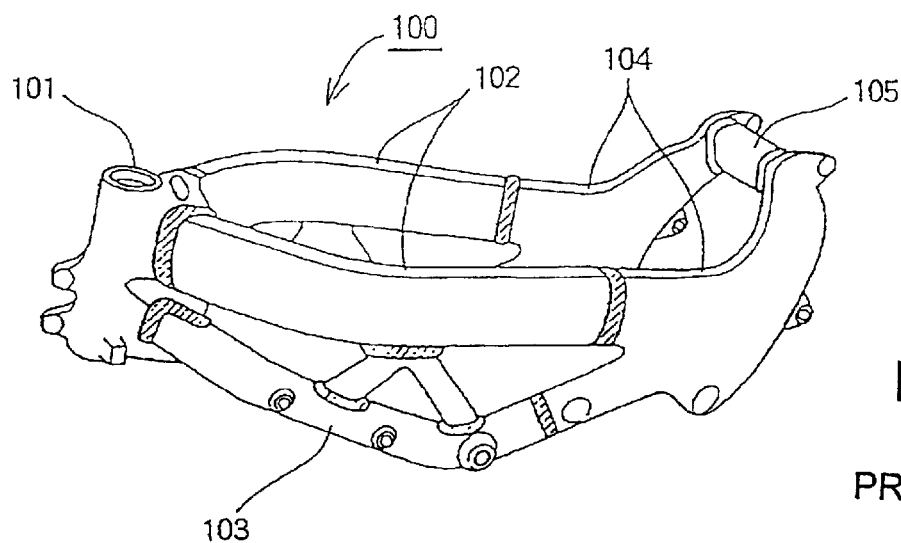
FIG. 7 is a perspective view of a representative vehicle body frame for a motorcycle.
Figure 8:
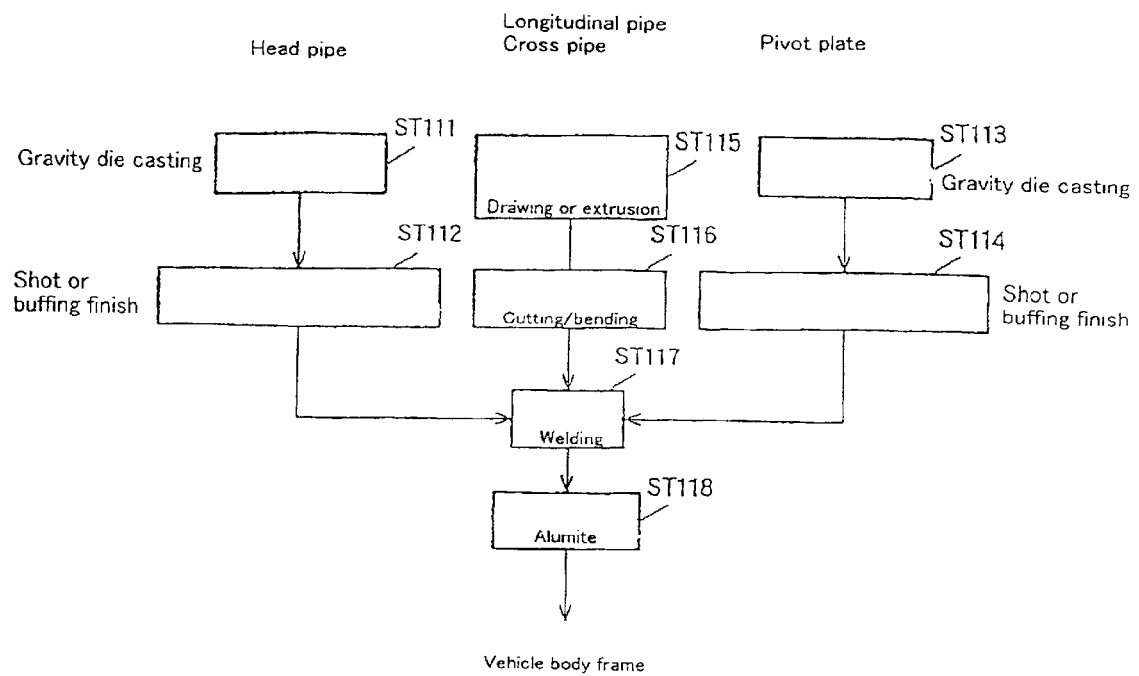
FIG. 8 is a fabrication flow diagram of a conventional vehicle body frame.

FIG. 5 is a graph showing a relationship between the gate speed and proof strength and FIG. 6 is a graph showing a relationship between the gate speed and tensile strength.

Figure 4:
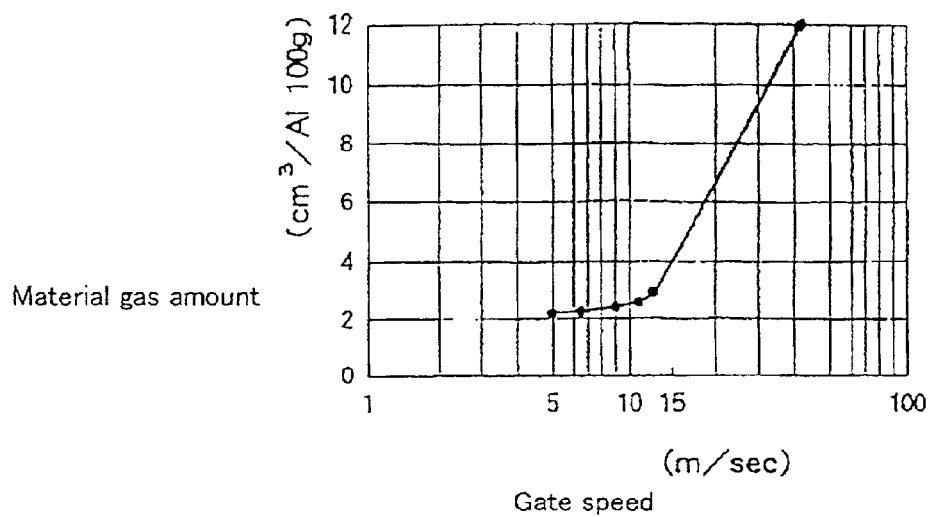
FIG. 4 is a graph investigating a relationship between gate speed and a material gas amount.

It is known that as has been explained in reference to FIG. 4, when the gate speed exceeds 15 m/s, the gas amount increases rapidly and therefore, the gases remains as air bubbles. When the gate speed exceeds 15 m/s in FIG. 5 and FIG. 6, both the proof strength and the tensile strength are remarkably reduced.

It is known from the explanation that in the aluminum alloy die casting, by restraining the gate speed to 15 m/s, entrapping of gasses can significantly be reduced. It is prospected that if gasses are not entrapped, the casting surface becomes fine compared with that of a conventional die cast product and the invented die cast product can be welded since there are no air bubbles.

Further, although detailed data will be omitted, when the gate speed becomes lower than 5 m/s, molten metal is cooled in a procedure of being filled in the cavity, resulting in a short run when molding.

Hence, it is preferable to set the gate speed to 5–15 m/s.

Next, an explanation will be given of coating.

There is adopted a coating whose color is the same as that of alumite coating when the coating is dried and providing a cross linked coating dried at room temperature. In the case of "cross linked coating" the coating strength is large and therefore, there is no concern of peeling of the coating. Further, since "normal temperature drying" is carried out, heated drying is not needed. If the heated drying is carried out, the alumite coating is impaired. Because the heated drying is not needed, a number of coating steps can be reduced and an increase in the fabrication cost can be restrained.

Accordingly, the cross linked coating dried at room temperature is carried out in order to achieve protection of alumite and maintenance of coating.

Further, the aluminum cast parts according to the present invention are the head pipe and the pivot plates according to the embodiment and the die cast products among them are the pivot plates. However, the present invention is not limited to this example, but the aluminum cast parts and the die cast articles may be any of members constituting the vehicle body frame for a motorcycle.

The aluminum series die cast products according to the present invention are the pivot plates according to the embodiment and the aluminum series non-die cast products are the head pipe, the longitudinal pipes and the cross pipe. However, the present invention is not limited to this example, but the aluminum series die cast products may be any of members constituting the vehicle body frame for a motorcycle.

Further, the longitudinal pipes or the cross pipe may be provided with any of a round section, a rectangular section or other noncircular section.

Further, aluminum here includes aluminum alloy.

The present invention achieves the following effects by the above-described constitution.

According to the present invention, in a vehicle body frame for a motorcycle including integrating pipes made of aluminum and a plurality of aluminum cast parts by welding, portions or a total of the plurality of aluminum cast parts are die cast products. Since the die cast products are provided with excellent production efficiency, a low cost of die cast products can be achieved. By making the die cast products portions of constituent parts, a reduction in the fabrication cost of the vehicle body frame can be achieved.

According to the present invention, coating die cast portions are adopted in portions of the vehicle body frame. After the alumite treatment, the die cast portions of alumite coating good in appearance compared with other portions thereof. Hence, by coating only the die cast portions, the appearance of the vehicle body frame is maintained.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A method of fabricating a vehicle body frame for a motorcycle comprising the following steps:

integrating aluminum series die cast products and aluminum series non-die cast products fabricated by a method other than die casting to form an integrated article having die cast portions and non-die cast portions;

subjecting the integrated article to an alumite treating coating; and additionally coating only the die cast portions of the integrated article with a coating having a color generally the same as the alumite coating.

2. The method of fabricating the vehicle body frame for a motorcycle according to claim 1, and further including the step of fabricating at least one of said die cast products with molten aluminum injected into a cavity under high pressure and at least another of said die cast products by gravity die casting molten aluminum into a cavity.

3. The method of fabricating the vehicle body frame for a motorcycle according to claim 2, wherein the high pressure die cast products are pivot plates for the vehicle body, said method further including the step of projecting shot grain onto the pivot plates for finishing the surface.

4. The method of fabricating the vehicle body frame for a motorcycle according to claim 2, wherein said step of additionally coating the die cast products does not include additionally coating the gravity die cast products.

5. The method of fabricating the vehicle body frame for a motorcycle according to claim 1, wherein a gate speed for the die casting is 5–15 m/s for the molten metal.

6. The method of fabricating the vehicle body frame for a motorcycle according to claim 1, wherein said coating having a color generally the same as the alumite coating is a cross linked coating.

7. A method of fabricating a vehicle body frame for a motorcycle comprising the following steps:

forming aluminum series die cast products by high pressure die casting;

forming aluminum series non-die cast products by a method other than high pressure die casting;

integrating said aluminum series die cast products and said aluminum series non-die cast products to form an integrated article having die cast portions and non-die cast portions;

subjecting the integrated article to an alumite treating coating; and additionally coating only the die cast portions of the integrated article with a coating having a color generally the same as the alumite coating.

8. The method of fabricating the vehicle body frame for a motorcycle according to claim 7, wherein the die cast products are pivot plates for the vehicle body, said method further including the step of projecting shot grain onto the pivot plates for finishing the surface.

9. The method of fabricating the vehicle body frame for a motorcycle according to claim 7, wherein a gate speed for the die casting is 5–15 m/s for the molten metal.

10. The method of fabricating the vehicle body frame for a motorcycle according to claim 7, wherein said coating having a color generally the same as the alumite coating is a cross linked coating.

* * * * *